United States Patent Office 2,833,816
Patented May 6, 1958

2,833,816

**PREPARATION OF AROMATIC POLYCAR-
BOXYLIC ACIDS**

Alfred Saffer, Bayside, N. Y., and Robert S. Barker, Plainfield, N. J., assignors, by mesne assignments, to Mid-Century Corporation, Chicago, Ill., a corporation of Delaware No Drawing. Application August 24, 1955
Serial No. 530,401

12 Claims. (Cl. 260—524)

The invention relates to a process for the catalytic oxidation of organic compounds. More particularly, it pertains to the oxidation of aromatic compounds containing one or more aliphatic substituents to produce corresponding aromatic carboxylic acids using molecular oxygen as the oxidizing means, and especially to a liquid phase oxidation process catalyzed by the conjoint presence of a metal and bromine. Further, the invention includes correlated improvements and discoveries whereby the oxidation, particularly of aromatic compounds containing an aliphatic substituent, is facilitated.

Numerous aromatic carboxylic acids may be prepared by catalytic oxidation of alkyl substituted aryl compounds by means of gaseous oxygen according to this invention, some of these acids, such as the phthalic acids, being now available in commerce. However, such acids may be produced according to the present invention with increased economy and convenience from readily available raw materials. Moreover, practice of the present invention enables economical production of numerous aromatic and alkaryl acids which have previously been unavailable except at inordinate cost. A particularly advantageous field of application of the present invention is in production of polycarboxylic aromatic acids.

The discoveries associated with the present invention and the objects achieved in accordance with the invention as described herein, include the following: a process catalytic oxidation by molecular oxygen of aromatic organic compounds containing at least one and preferably a plurality of aliphatic substituents in the conjoint presence of a metal and bromine to produce carboxy aromatic compounds; a process for catalytic oxidation in liquid phase by means of molecular oxygen, to carboxy aromatic compounds, of an aromatic compound having at least one and preferably a plurality of aliphatic substituents wherein the aliphatic carbon atom attached directly to an aromatic nucleus in at least one of such aliphatic substituents contains at least one hydrogen or oxygen atom, in the conjoint presence of metal or metal ions and bromine or bromine ions; such processes wherein the metal is a heavy metal; such processes wherein at least one aliphatic substituent contains from 1 to 4 carbon atoms per aromatic nuclear carbon atom to which it is attached; such processes carried out in the presence of an acid, such as for example, a lower aliphatic mono carboxylic acid containing 1 to 8 carbon atoms in the molecule, said acid being in liquid phase, and preferably being saturated and containing 2–4 carbon atoms in the molecule and preferably employing about 0.1–10 parts by weight of such acid per part by weight of aliphatic substituted aromatic compound; such processes wherein the catalyst is manganese bromide or cobalt bromide or combinations thereof; such processes wherein the catalyst is provided as a mixture of a lower aliphatic carboxylate salt of the desired metal and a bromide or bromate; such processes applied specifically to alkyl benzenes wherein each alkyl substituent contains 1 to 4 carbon atoms; and other such processes and modifications thereof as will be apparent as details or embodiments of the invention are set forth hereinafter.

In the practice of the invention, the oxidation of organic compounds whereby corresponding aromatic carboxylic acids, particularly polycarboxylic acids, are obtained, may be effected by reacting such compounds with molecular oxygen, e. g. air, in the conjoint presence of catalytic amounts of a metal and of bromine. Metals of the group of heavy metals shown in the "Periodic Chart of Elements" appearing on pages 56 and 57 of the "Handbook of Chemistry," 8th edition, published by Handbook Publishers, Inc., Sandusky, Ohio, 1952, have been found desirably applicable to this invention for furnishing the metal or metal ion portion of the metal-bromine catalyst. Of the heavy metal group, those metals having an atomic number not greater than 84 have been found most suitable. However, as will appear, metals outside the heavy metal group may also be employed. We have also found that excellent results are obtained by the utilization of a metal having an atomic number 23–28, inclusive. Particularly excellent results are obtained with a metal of the group consisting of manganese, cobalt, nickel, chromium, vanadium, molybdenum, tungsten, tin and cerium. It has also been found that the catalytic amount of the metal may be either as a single metal or as a combination of such metals. The metal may be added in elemental, combined or ionic form and the bromine may be added similarly in elemental, combined or ionic form. As a source of ionic bromine, ammonium bromide or other bromine compounds soluble in the reaction medium may be employed. Satisfactory results have been obtained, for example, with potassium bromate, tetrabromoethane and benzyl bromide.

The metal may be supplied in the form of metal salts. For example, the metal manganese may be supplied as the manganese salt of a lower aliphatic carboxylic acid, such as manganese acetate, in the form of an organic complex, of which mention may be made of the acetylacetonate, the 8-hydroxy-quinolinate and the ethylene diamine tetra-acetate, as well as manganese salts such as the borates, halides and nitrates which are also efficacious.

The reaction temperature should be sufficiently high so that the desired oxidation reaction occurs, and yet not so high as to cause undesirable charring or formation of tars. Thus, temperatures in the range of 120 to 275° C., desirably 150 to 250° C., and preferably 170 to 225° C. may be employed. The reaction time should be sufficient to obtain a desirable conversion of the substituted aromatic material to the desired aromatic carboxy compound, e. g., in the range of about 0.5 to 25 or more hours, preferably up to about 4 hours.

The oxygen used may be in the form of substantially 100% oxygen gas or in the form of gaseous mixtures containing lower concentrations of oxygen, such as, for example, air. The ratio of total oxygen fed into the reaction mixture relative to the hydrocarbon is in the range of about 2 to 500 mols of oxygen per mol of substituted aromatic material, desirably in the range of 5 to 300, and preferably in the range of 5 to 75.

The process of the present invention should be conducted under essentially liquid phase conditions wherein a liquid phase is maintained in the reaction zone. Thus, the feed is not substantially vaporized. The relation of temperature and pressure should be so regulated as to provide a liquid phase in the reaction zone. Generally, the pressure may be in the range of atmospheric up to about 1500 p. s. i. g. The liquid phase may comprise all or a portion of the organic reactant or it may comprise a reaction medium in which the organic reactant is soluble or suspended.

When the conditions are such that the desired carboxy aromatic product may be obtained and readily separated from the reaction mixture in the absence of additional reaction medium, such added medium is not required. However, where all such conditions do not obtain or where the presence of an added reaction medium is desired to facilitate carrying out the desired reaction or recovering the desired product or products, an added medium may be included. This added medium may be, and often desirably is, a monocarboxylic acid relatively stable or inert to oxidation in the reaction system, preferably containing about 1 to 8 carbon atoms in the molecule. Saturated aliphatic acids containing 2 to 4 carbon atoms in the molecule and free of hydrogen atoms attached to tertiary carbon atoms are particularly preferred. Where all the advantages of an acid medium are not required, other inert media can be used.

Where the lower aliphatic monocarboxylic acid medium is used, it is generally not necessary to use large amounts thereof. Such acids in the range of 0.1 to 10 parts by weight, desirably 0.5 to 4, and preferably 1 to 2.5 per part of the aromatic material, have been found adequate.

The catalyst, illustratively, may be manganese bromide, and it may be added as such or by means of materials which provide a catalytic amount of manganese and of bromine in the reaction system. Manganese may be added in the form of the metal, oxide or acetate or analogous carboxylate salts including a salt of a carboxylic acid which may be formed in the reaction system or as a manganese halide; and the bromine may, as above indicated, be added in the form of elemental bromine, as ammonium bromide or other bromine compounds soluble in the system, e. g. potassium bromate. If desired, the bromine may be in the form of a soluble organic bromide, viz. tetrabromoethene, benzyl bromide, and the like. The amount of the catalyst calculated as $MnBr_2$ may be in the range of about 0.1 to 10 percent by weight or more of the aromatic reactant charged, desirably 0.3 to 2, and preferably 0.5 to 1.7 percent. Mixtures of materials may be used; and the proportions of manganese and bromine may be varied from their stoichiometric proportions encountered in $MnBr_2$, e. g., in the range of about 1 to 7 atoms of manganese per atom of bromine, and about 1 to 10 atoms of bromine per atom of manganese. Moreover, the manganese may, as above indicated, be utilized in the form of an organic complex by way of example as the acetylacetonate, the 8-hydroxy quinolinate, and the ethylene diamine tetra acetate of manganese.

In order to facilitate a clear understanding of the invention, the following preferred specific embodiments are described in detail:

*Example 1*

Into a suitable reactor having a corrosion resistant inner surface (e. g. glass, ceramic or corrosion resistant metal or alloy), equipped with agitating means such as a mechanical agitating device or gas flow agitating means, and with means for heating or cooling the contents thereof such as a coil or jacket (and optionally a reflux condenser equipped with a separatory device for separating water and refluxing non-aqueous condensate to the reaction vessel, a gas inlet tube, and a vent for passing off low boiling materials), there are charged:

48.8 parts by weight of xylene (95% para)
125 parts of acetic acid (100%)
0.6 part of manganese acetate
0.5 part of ammonium bromide The reaction vessel is about half filled with the liquid mixture.

Air is fed into the reaction mixture at the rate of 3000 volumes/hour/volume of reaction mixture (measured at the reactor exit at a atmospheric pressure and about 27° C.), while the reaction mixture is maintanied at 195° C., with vigorous agitation, for two hours; and the pressure is maintained at about 200 to 400 p. s. i. g. (pounds per square inch gauge); this pressure being such that the reaction mixture contains a liquid phase containing acetic acid.

The crude solid terephthalic acid in the mixture may be separated by filtration, given three washings with about 100% acetic acid, each washing being with about 100 parts by weight of acetic acid per 40 parts of the precipitate, and then given three washings with water, using approximately similar amounts. The acetic acid washings are distilled; the residue may be recycled to the reactor or may be processed to recover a mixture of aromatic acids therefrom. The exit gases from the reactor are passed through two Dry Ice traps in series, and the liquid collected therein during the reaction was washed with about 2 volumes of water to remove water soluble materials therefrom, and a small amount of unreacted xylene is recovered.

A light colored terephthalic acid product is obtained in a weight yield of about 118 percent (75% of theory). Similar results are obtained with manganese or cobalt bromide as the catalyst. However, with manganese chloride alone, only about 25–30% by weight yield was obtained (a four-fold to five-fold difference) under comparable conditions. The results obtained with manganese fluoride, acetate or iodide, or ammonium bromide (i. e. hydrogen bromide in the acidic system) without a metal, are less favorable than with the manganese chloride.

*Example 2*

The above example is repeated except using:

125 parts para-cymene
125 parts acetic acid
1.2 parts manganese acetate
0.95 part ammonium bromide and a terephthalic acid yield of 58.6% of theory is obtained which corresponds to a 73% weight yield. With manganeses bromide similar results (73% by weight yield) are obtained. However, in a comparable run using solely two parts manganese acetate as the catalyst, the yield was not over about 7% by weight (a ten-fold difference); and using manganese chloride, it was even lower.

*Example 3*

The above Example 2 is repeated except using a diethylbenzene mixture, and about 58% by weight yield of phthalic acids are obtained.

The above examples are repeated and comparable yields of the corresponding phthalic acids are obtained from the following starting hydrocarbons:

| Example No. | Hydrocarbon | Acid Obtained |
|---|---|---|
| 4 | p-n-propyl toluene | terephthalic. |
| 5 | p-n-butyl toluene | Do. |
| 6 | p-i-butyl toluene | Do. |
| 7 | meta-xylene | isophthalic. |
| 8 | meta-cymene | Do. |
| 9 | meta-diethylbenzene | Do. |
| 10 | meta-n-propyl toluene | Do. |
| 11 | meta-n-butyl toluene | Do. |
| 12 | meta-i-butyl toluene | Do. |
| 13 | ortho-xylene | phthalic. |
| 14 | ortho-cymene | Do. |
| 15 | ortho-diethylbenzene | Do. |
| 16 | ortho-n-propyl toluene | Do. |
| 17 | ortho-n-butyl toluene | Do. |
| 18 | ortho-i-butyl toluene | Do. |

In runs comparable to Examples 7 and 13, except using solely manganese chloride as the catalyst, comparably lower yields of the respective acid are obtained in each instance. A mixture of ethyl toluenes treated similarly with manganese bromide catalyst gives about 75% by weight of the mixed phthalic acids.

In the case of the isophthalic acids, the crude solid isophthalic acid in the mixture is separated by filtration, and washed with about 10 parts by weight of benzene. Alternatively, it may be given three washings with about 100% lower carboxylic acid; e. g., acetic acid, each washing being with about 100 parts by weight of the acid per 40 parts of the precipitate, and then given three washings with water, using approximately similar amounts. The acetic acid washings are recycled in the next run.

In the case of the phthalic acid, the acid may be recovered by heating to convert to the anhydride which may be sublimed or distilled and condensed.

The crude phthalic acids may be converted to the corresponding dialkyl phthalates by reaction with methanol or an analogous lower alkanol of 1 to 3 carbon atoms in the molecule, in the presence of a catalytic amount of an acid such as hydrochloric, sulfuric, phosphoric or the like, e. g., in an amount in the range of up to about 3% by weight of the reaction mixture. Alternatively, they may be first converted to the corresponding acid chloride and the latter reacted with methanol. The resulting alkyl phthalates may be separated by fractionation, or purified by steam distillation. They are useful in the form of the esters, e. g., for preparation of polyester type resins by reaction with polyhydric materials such as ethylene glycol, or glycerol or the like. If desired, the dialkyl ester may be converted to the acid by hydrolysis in the presence of dilute aqueous acid.

*Example 19*

The above Example 1 procedure is repeated using:

75 parts mesitylene (1,3,5-trimethylbenzene)
150 parts acetic acid
1 part manganese bromide at a reaction temperature of 196° C. and a pressure of 400 p. s. i. g., for three hours. The reaction mixture is filtered at about 50 to 60° C. Methyl isophthalic acid is obtained in a yield of about 15 weight percent (acid number 627, theory 623).

*Example 20*

The above Example 19 procedure is repeated using:

75 parts mesitylene
175 parts acetic acid
1.5 parts cobalt naphthenate
0.8 part hydrobromic acid (as 40% aqueous solution)

at a temperature of 204 to 210° C. Trimesic acid is obtained in an about 83 percent yield (acid number 789, theory 800).

*Example 21*

The above Example 19 procedure is repeated using:

75 parts mesitylene
150 parts acetic acid
1 part manganese bromide
0.5 part manganese acetate
0.5 part cobalt naphthenate
0.5 part ammonium bromide for 1½ hours. Trimesic acid is obtained in an 118 weight percent yield (67 percent of theory; acid number 795). In similar manner with 1,3,5-ethylxylene, a 103 weight percent yield is obtained (77% of theory) of tricarboxylic acid; and with durene, a 50 weight percent yield of methyl-tricarboxylic acid is obtained.

*Example 22*

The above Example 19 procedure is repeated using:

75 parts pseudocumene (1,2,4-trimethylbenzene)
150 parts acetic acid
1.5 parts cobalt napthenate
1.5 parts manganese acetate
1.5 parts ammonium bromide at 198° C. for two hours. On filtering the reaction mixture, trimellitic acid (1, 2, 4-benzene tricarboxylic acid) is obtained in an about 92 weight percent yield.

*Example 23*

The above Example 19 procedure is repeated using:

75 parts of ditolylethane
150 parts of acetic acid
1 part manganese bromide at a temperature of 195° C. for two hours. The reaction mixture is filtered at about 50° C. and the solid washed with two 75 part by weight portions of hot acetic acid (about 75° C.) and the solid dried to constant weight. A benzene dicarboxylic acid mixture is obtained in an about 95 weight percent yield (acid number 680, theory 675). This mixture analyzes as 84% by weight isophthalic and 16% terephthalic acid (by accepted infra-red analysis methods; Analytical Chemistry, November 1954, page 1765, January 1955, page 7, and Perkin-Elmer News, vol. 4, No. 3, 1953).

*Preparation of ditolylethane.*—The following mixture is charged to a reactor having a glass inner surface, equipped with a mechanical stirrer, thermometer, reflux condenser, mercury manometer, and two water bubblers in series:

936 parts of toluene
150 parts of ethylene dichloride
20.2 parts of anhydrous aluminum chloride and reacted at 85° C. The worked-up products are separated by low pressure distillation into two cuts, ditolylethane fraction boiling at 143–145° C. at 3–6 mms. pressure and higher polytolylethanes boiling at 195–205° C. at 3–6 mms. pressure. The undistilled residue which corresponds to highly polymerized products is about 1.3% by weight of the total alkylate.

The distillation data show that the alkylation product contains:

|  | Parts | Weight, percent |
| --- | --- | --- |
| Toluene | 615 | 64.0 |
| Ditolylethane | 249 | 25.8 |
| Higher Polytolylethane | 81 | 8.4 |
| Residue | 12 | 1.3 |
| Total | 957 |  |

The weight yields of alkylation products based on the weight of toluene consumed are 77.4% of ditolylethane and 25.2% higher polytolylethane.

*Example 24*

A process is conducted in an apparatus having in combination a corrosion-resistant pressure oxidation reactor and a water-cooled condenser mounted above the reactor. The reactor section is wound with Nichrome ribbon to a height of about ⅓ the reactor height. When the oxidation is in progress, air under pressure is admitted to the reactor through a gas distributor located just above the bottom, and the upper end of the condenser is sealed. Vent gases exit through a tube at the top of the condenser and pass through a needle control valve; a mercury-in-glass flow meter and a Dry Ice trap prior to venting to the atmosphere. The reactor is charged by adding weighed amounts of each reactant through the top of the condenser, which is then closed and the reactor pressure raised to about 400 p. s. i. g. with air. Thus the reactor is charged with 75 parts of 95% p-xylene, 150 parts of acetic acid, one part of manganese acetate tetrahydrate and 0.75 part of ammonium bromide. The pressure is set at 400 p. s. i. g. and the reactor section heated to 385° F. The exit control valve is adjusted so that the flow rate of gas through the exit flowmeter is 3000 volumes/hour/volume of reaction mixture. When the temperature reaches 385° F., the external heating is halted and the temperature rises because of the exothermicity of the reaction. After the initial reaction, external heat is applied to maintain a reaction temperature of 385–400° F. for a total of 1.5 hours. Upon completion of the reaction, as shown by 20–21% oxygen content (Orsat gas analysis) of the exit gas, the reactor is allowed to cool to 185° F. and depressured. The liquid products are removed at 150°–200° F. by applying back pressure from a nitrogen cylinder through the condenser. The reactor liquid is drained by opening a union in the air feed line. The bottom flange is removed and the solid product scraped from the reactor section. The solid and liquid products are combined and filtered. The insoluble terephthalic acid residue is washed twice with 75 mls. of hot acetic acid and dried. A weight yield of 115% terephthalic acid is obtained (acid number 672, theory 675).

In comparative runs with paraxylene and a given amount of metal bromide, using a mixture of manganese and cobalt bromides in equal parts, the yield of terephthalic acid is about 12 or more weight percent points higher than when using either metal bromide alone.

Example 25

Powdered manganese metal (300 mesh), one part, is substituted for manganese acetate in Example 24. The yield of terephthalic acid is 110 weight percent.

Example 26

Nickel (II) bromide, one part, is substituted for both the manganese acetate and ammonium bromide in Example 24. A 95 weight percent yield of terephthalic acid is obtained.

Example 27

Cobalt acetate, one part, is substituted for manganese acetate in Example 24. A 122 weight percent yield of terephthalic acid is obtained.

Example 28

A mixture of one part of cerium hydroxide, one part of ammonium bromide and 50 mls. of 20% hydrobromic acid is evaporated to dryness and the resultant material substituted for the manganese acetate and ammonium bromide in Example 24. A 117 weight percent yield of terephthalic acid is obtained.

Example 29

Tungstic acid, one part, is substituted for the cerium hydroxide in Example 28 and a yield of 116 weight percent of terephthalic acid is obtained.

Example 30

Ammonium molybdate, one part, is substituted for the cerium hydroxide in Example 28 to yield 114 weight percent of terephthalic acid.

Example 31

A mixture of ammonium meta-vanadate, one part, and chromic acetate, one part, is substituted for cerium hydroxide in Example 28 to yield 108 weight percent of terephthalic acid.

Example 32

One part of Raney nickel alloy which consists of aluminum and nickel is treated with ammonium bromide and HBr as described in Example 28 and the resultant catalyst mass is substituted for manganese acetate and ammonium bromide described in Example 24. The yield of terephthalic acid is 101 weight percent.

Example 33

Manganese acetyl acetonate, one part, is substituted for manganese acetate in Example 24 to yield 102 weight percent of terephathalic acid.

Example 34

Manganese 8-hydroxy quinolate (2 parts) is substituted for manganese acetate in Example 24 to yield 105 weight percent of terephthalic acid.

Example 35

Two parts of the manganese complex of ethylene diamine tetracetic acid are substituted for manganese acetate in Example 24 to yield 100 weight percent of terephthalic acid.

Example 36

One part of manganese borate in place of manganese acetate in Example 24 produces 110 weight percent of terephthalic acid.

Example 37

One part of manganese chloride in place of manganese acetate in Example 24 yielded 102 weight percent of terephthalic acid.

Example 38

The use of free bromine, one part, substituted for the ammonium bromide in Example 24 yields 116 weight percent of terephthalic acid.

Example 39

Potassium bromate, one part, is substituted for ammonium bromide in Example 24 and a yield of 124 weight percent of terephthalic acid is obtained.

Example 40

Tetrabromoethane, one part, is substituted for ammonium bromide in Example 24 and a yield of 126 weight percent of terephthalic acid is obtained.

Example 41

Benzyl bromide, one part, in place of ammonium bromide in Example 24 gives a yield of 103 weight percent of terephthalic acid.

Example 42

One part of ammonium chromate, 0.5 part of ammonium bromide and 50 of 20% HBr are mixed in a casserole and evaporated to dryness. The powder so obtained is charged to the reactor described in Example 24. Seventy-five parts of p-xylene, 150 parts of acetic acid and 0.75 part of ammonium bromide are added to the reactor. The oxidation conditions are maintained as described in Example 24. A weight yield of 111% of terephthalic acid is obtained.

Example 43

Two part of a 50% manganese nitrate solution and 0.75 part of ammonium bromide are charged into the reactor of Example 24 containing 75 parts of p-xylene and 150 parts of acetic acid. Terephthalic acid is obtained in a weight yield of 108%.

Example 44

One hundred parts of cumene, 150 parts of acetic acid, one part of manganese acetate and 0.75 part of ammonium bromide are charged to the oxidation reactor of Example 24. The oxidation is conducted at 400 p. s. i. g., 3000 volumes/hour/reaction mixture volume exit gas flow and 400–420° F. for two hours. The concentration of carbon dioxide in the outlet gas reaches 6.6% and the oxygen concentration in the vent gas reaches a minimum of 1.0%. The reactor contents collected are 275.1 parts and form a clear solution. Two hundred and seventy-five parts of water are added to the reactor drainings at room temperature. The solids which precipitate are filtered and washed with 250 parts of water. The precipitate is dried in an oven at 60° C. and a weight of 52.4 grams of benzoic acid are obtained. The filtrate and water wash are combined and additional solids precipitated. The second crop of solids is filtered and washed with 100 parts of water. A dry weight of 2.4 parts of benzoic acid is obtained. The precipitation procedure is repeated three more times by combining each water wash with the main filtrate. There were obtained 1.9 parts, 0.6 part and 0.1 part respectively of benzoic acid. Thus a total of 57.4 parts of benzoic acid is obtained from 100 grams of cumene feed.

Example 45

One part of manganese bromide is used in place of manganese acetate and ammonium bromide in Example 44. The benzoic acid product is isolated by the same water dilution technique. A total yield of 55.8% of benzoic acid is obtained.

Substitution of an equal weight of toluene in the foregoing example for the cumene there used gives a weight yield of 117% benzoic acid.

In similar manner, with 100 parts ethyl benzene and 150 parts acetic acid a 90 percent yield of benzoic acid is obtained (79% of theory); also, p-tertiary-butyl-toluene gives 104 weight percent yield of the corresponding benzoic acid, but no dicarboxylic acid. At 485° F. utilizing caproic acid in place of the acetic acid, a 10% weight yield of terephthalic acid is obtained from p-tertiary butyl-toluene. In a manner similar to Example 21, pentamethylbenzene gives a methylbenzene-tetracarboxylic acid.

In some cases an induction period of up to several hours is noted before reaction occurs, e. g., when maganese fluoride is used in place of manganese acetate, and in conjunction with ammonium bromide. This is shown in the following example.

Example 46

A reaction mixture of 75 parts para-xylene, 150 parts acetic acid, 1 part manganese fluoride and 0.75 part ammonium bromide is added to the reactor of Example 24. The reactor charge is maintained at 410° F. for two hours without evidence of oxygen absorption. Suddenly the reaction commences and normal oxygen absorption is observed during the next hour. A yield of 77 grams of terephthalic acid (103% weight yield) is obtained following the standard workup of the reaction mixture as described in Example 1.

Initiators such as peroxides, aldehydes, ketones and the like may be utilized to minimize the length of the induction period.

Example 47

Seventy-five parts of triethylbeneze are oxidized according to the procedure of Example 24 for three hours at 400–420° F. in the presence of 150 parts acetic acid, 1 part managanese acetate and 0.75 part of ammonium bromide. The reactor contents are drained and filtered. The filter cake is slurried with 50 parts of acetic acid (wash) and filtered. The dry weight of tribasic acid obtained is 28.7 grams, which corresponds to a weight yield of 38%.

Example 48

The ammonium bromide is omitted from the reactor charge described in Example 47. Only 1 part of tribasic acid was obtained, which corresponds to a weight yield of 1.3%.

Example 49

It has been found the reaction medium may be cyclohexane carboxylic acid in place of acetic acid for the oxidation of paradiisopropylbenzene to terephthalic acid.

To the reactor of Example 24 there are charged 125 parts para-di-isopropylbenzene
125 parts cyclohexane carboxylic acid
2 parts manganese bromide.

The oxidation is carried out for 4 hours at 400–420° F. There is obtained 29.3 parts terephthalic acid which corresponds to a 23.4 weight percent yield.

Similarly utilizing an equal weight of benzoic acid in place of the cyclohexane carboxylic acid in the foregoing example gives a comparable yield of terephthalic acid. Thus a variety of carboxylic acids can be utilized as a reaction medium. When all of the advantages are not required various carboxylic acids, including the intermediate oxidation products of the material being oxidized, can be used to advantage.

For example, in a single cycle run of the type of Example 1, except with no acetic acid medium a low yield of terephthalic acid is obtained (about 8 to 20% by weight) together with a large amount of toluic acid. By recovering the former and recycling the latter acid with fresh hydrocarbon feed, and operating at temperatures above the melting point of toluic acid, substantially complete conversion of the hydrocarbon feed to terephthalic acid may be obtained.

In general, according to the present invention it is possible to obtain yields of carboxylic acids in excess of 50% by weight per pass thus reducing the amount of recycle necessary to obtain high ultimate or overall yields and in many instances obviating the necessity of recycling.

The process of the present invention can be conducted on a continuous, intermittent or batch basis. Water may be removed to maintain desired concentration, e. g., by distillation, by adding acetic anhydride, or the like.

Among further metals which can be utilized conjointly with bromine to oxidize an aliphatic substituted aromatic compound to a corresponding carboxy aromatic compound are:

| Metal bromide | Hydrocarbon | Product |
| --- | --- | --- |
| Beryllium | p-xylene | p-Toluic. |
| Aluminum | cumene | Benzoic. |
| Do | p-di-isopropylbenzene | Cumic. |
| Bismuth | p-cymene | p-Toluic. |
| Cadmium | cumene | Benzoic. |
| Iron (II) | p-cymene | p-Toluic. |
| Do | cumene | Benzoic. |
| Palladium | p-cymene | Toluic. |
| Lead | cumene | Benzoic. |
| Do | p-di-isopropylbenzene | Cumic. |
| Neodymium | do | Do. |

Desirable or comparable results may be achieved with various modifications of the foregoing within the broad range set forth herein, thus: the pressure should be sufficient to maintain a liquid phase which, if a solvent is used should contain at least some of the said solvent. Generally, the pressure may be in the range of atmospheric up to about 1500 p. s. i. g.

The substituted aromatic material fed into the reactor may be an alkylbenzene (one to six methyl and the like alkyls), in technically pure form, free from contaminants or materials which may interfere with the oxidation reaction. It may be a mixture of isomeric materials or such a mixture containing lower or higher homologues. It may also contain some saturated aliphatic hydrocarbon materials of similar boiling ranges. Mixtures of materials may be used, converted to the corresponding mixtures of aromatic carboxylic acids, which acids may then be separated, e. g., by physical means such as distillation, or by a combination of chemical and physical means such as esterification followed by fractionation.

In one aspect of the invention, a polymeric hydrocarbon material used may be prepared in a manner analogous to the preparation of the hydrocarbon of Example 23 except reacting benzene with ethylene dichloride. Such polymeric materials are known and contain a higher multiple than ditolylethane of the following units

wherein the end positions of the chain may be occupied by a hydrogen atom or a phenyl group; and $n$ is an integer, of about 2 to 12, or up to 20 or more. An important advantage of this type of compound is that dibasic acids may be prepared therefrom.

Instead of using ethylene dichloride to prepare the above polymeric material, other analogous aliphatic dichloride may be used, each chlorine being on different carbon atoms, which carbon atoms may be directly joined or may be separated by one or more carbon atoms up to about 6. However, for economic reasons, ethylene dichloride is preferred.

Aliphatic substituents on the aromatic nucleus may be bifunctional groups attached to two different aromatic carbon atoms, e. g., phthalide or tetrahydronaphthalene which latter compound provides two aliphatic carbon atoms for each substituted aromatic carbon atom. This is within the range of 1 to 4 aliphatic carbon atoms per substituted aromatic carbon atom as discussed above. All or part of the aromatic carbon atoms may be substituted by an aliphatic group and two or more of the substitutents may be converted to the corresponding carboxylic acid group.

Partial oxidation products of the above-mentioned materials may also be treated according to the present invention, e. g., alkaryls or the like wherein the aliphatic substituents are converted to intermediate oxygenated derivatives such as alcohols, aldehydes, ketones, peroxide type compounds, and the like.

The substituted aromatic compounds which are treated in accordance with the invention may contain one aromatic nucleus or may be polynuclear; e. g., benzene, naphthalene, anthracene, phenanthrene, diphenyl, triphenyl, and the like, having the above-mentioned aliphatic substituents. These include methylbenzene, ethylbenzene, n-propylbenzene, i-propylbenzene, n-butylbenzene, s-butylbenzene, cyclohexylbenzene, dimethylbenzene, diethylbenzene, di-n-propylbenzene, di-i-propylbenzene, di-n-butylbenzene, di-s-butylbenzene, trimethylbenzene, triethylbenzene, tri-n-propylbenzene, tri-i-propylbenzene, tri-n-butylbenzene, tri-s-butylbenzene, ethyltoluene, ethyl-n-propyltoluene, ethyl-i-propyltoluene, ethyl-s-butyltoluene, diethyltoluene, diethyl-n-propyltoluene, diethyl-i-propyltoluene, diethyl-s-butyltoluene, triethyltoluene, triethyl-n-propyltoluene, triethyl-i-propyltoluene, triethyl-s-butyltoluene, n-propylethylbenzene, i-propylethylbenzene, n-butylethylbenzene, s-butylethylbenzene, dimethylethylbenzene, di-n-propylethylbenzene, di-i-propylethylbenzene, di-n-butylethylbenzene, di-s-butylethylbenzene, trimethylethylbenzene, tetraethylbenzene, tri-n-propylethylbenzene, tri-i-propylethylbenzene, tri-n-butylethylbenzene, tri-s-butylethylbenzene, i-propyl-n-propylbenzene, n-butyl-n-propylbenzene, s-butyl-n-propylbenzene, dimethyl-n-propylbenzene, di-i-propyl-n-propylbenzene, di-n-butyl-n-propylbenzene, di-s-butyl-n-propylbenzene, trimethyl-n-propylbenzene, triethyl-n-propylbenzene, tri-n-propylbenzene, tri-i-propylbenzene, tri-n-butyl-n-propylbenzene, tri-s-butyl-n-propylbenzene, n-butyl-i-propylbenzene, s-butyl-i-propylbenzene, dimethyl-i-propylbenzene, diethyl-i-propylbenzene, di-i-propylbenzene, di-n-propyl-i-propylbenzene, di-s-butyl-i-propylbenzene, trimethyl-i-propylbenzene, triethyl-i-propylbenzene, tri-n-propylbenzene, tri-n-butyl-i-propylbenzene, i-butyl-n-butylbenzene, dimethyl-i-butylbenzene, diethyl-i-butylbenzene, di-n-propyl-i-butylbenzene, di-i-propyl-i-butylbenzene, di-n-butyl-i-butylbenzene, di-s-butyl-i-butylbenzene, trimethyl-i-butylbenzene, triethyl - i - butylbenzene, tri - n - propyl - i - butylbenzene, tri-i-propyl-i-butylbenzene, dimethyl-s-butylbenzene, diethyl - s - butylbenzene, di - n - propyl - s - butylbenzene, di-i-propyl-s-butylbenzene, di-n-butyl-s-butylbenzene, trimethyl - s - butylbenzene, triethyl - s - butylbenzene, tri-n-propyl-s-butylbenzene, tri-i-propyl-s-butylbenzene, tri-n-butyl-s-butylbenzene, and correspondingly (or higher) substituted polynuclear materials; also alpha-methyl naphthalene, beta-methyl naphthalene, dimethyl biphenyl, methyl acetophenones, toluic acids, acetobenzoic acids and 1,3-dimethyl-4-chloro-benzene (the isophthalic acid derivative resulting from the latter may be converted to the corresponding phenol by replacing the chloro group by a hydroxyl group in known manner).

This application is a continuation-in-part of the copending applications Serial No. 427,370, filed May 3, 1954; Serial No. 427,865, filed May 5, 1954; Serial No. 431,588, filed May 21, 1954; Serial No. 495,347, filed May 18, 1955; Serial No. 435,915, filed June 10, 1954; and Serial No. 435,916, filed June 10, 1954, all of which are now abandoned.

In view of the foregoing disclosures, variations and modifications of the invention will be apparent to those skilled in the art, and it is intended to include within the invention all such variations and modifications except as do not come within the scope of the appended claims.

We claim:

1. A process for producing a polycarboxylic aromatic acid which comprises reacting in a reaction zone, while maintaining a liquid phase in said zone, an aromatic compound selected from the group consisting of polyalkyl aromatic compounds and intermediate oxygenated derivatives thereof with molecular oxygen in the presence of a catalyst comprising in conjoint presence bromine and a heavy metal oxidation catalyst and recovering said polycarboxylic aromatic acid.

2. A process as defined in claim 1 wherein the metal is in ionic form.

3. A process as defined in claim 1 wherein the bromine is in ionic form.

4. A process as defined in claim 1 wherein the heavy metal has an atomic number of 23 to 28 inclusive.

5. A process defined in claim 1 wherein the heavy metal is cerium.

6. A process as defined in claim 1 wherein the heavy metal is manganese.

7. A process as defined in claim 1 wherein the heavy metal comprises manganese and cobalt.

8. A process as defined in claim 1 carried out in the presence of a monocarboxylic acid having 1 to 8 carbon atoms in the molecule.

9. A process as defined in claim 8 wherein the monocarboxylic acid is acetic acid, the temperature is in the range of 120° to 275° C. and the pressure is in the range of 0 to 1500 p. s. i. g.

10. A process for producing a polycarboxylic aromatic acid which comprises reacting in a reaction zone, while maintaining a liquid phase in said zone, a xylene with molecular oxygen in the presence of a catalyst comprising in conjoint presence bromine and a heavy metal oxidation catalyst and recovering said polycarboxylic aromatic acid.

11. A process for producing a polycarboxylic aromatic acid which is a member of the group consisting of alkyl substituted dicarboxylic aromatic acid, tricarboxylic aromatic acid and mixtures thereof which comprises reacting in a reaction zone, while maintaining a liquid phase in said zone, a trialkyl benzene, in which the alkyl substituents contain 1 to 4 atoms of carbon, with molecular oxygen in the presence of a catalyst comprising in conjoint presence bromine and a heavy metal oxidation catalyst and recovering said carboxylic aromatic acid.

12. A process as defined in claim 11 wherein the trialkyl benzene is a trimethyl benzene.

References Cited in the file of this patent

UNITED STATES PATENTS

| | | |
|---|---|---|
| 2,245,528 | Loder et al. | June 10, 1941 |
| 2,276,774 | Henke et al. | Mar. 17, 1942 |
| 2,723,994 | Haefele et al. | Nov. 15, 1955 |

FOREIGN PATENTS

| | | |
|---|---|---|
| 1,017,881 | France | Oct. 1, 1952 |